April 13, 1965  J. A. MAHONEY  3,177,525
METHOD AND MACHINE FOR STUFFING FOOD PRODUCTS INTO CASINGS
Filed April 17, 1963  2 Sheets-Sheet 1
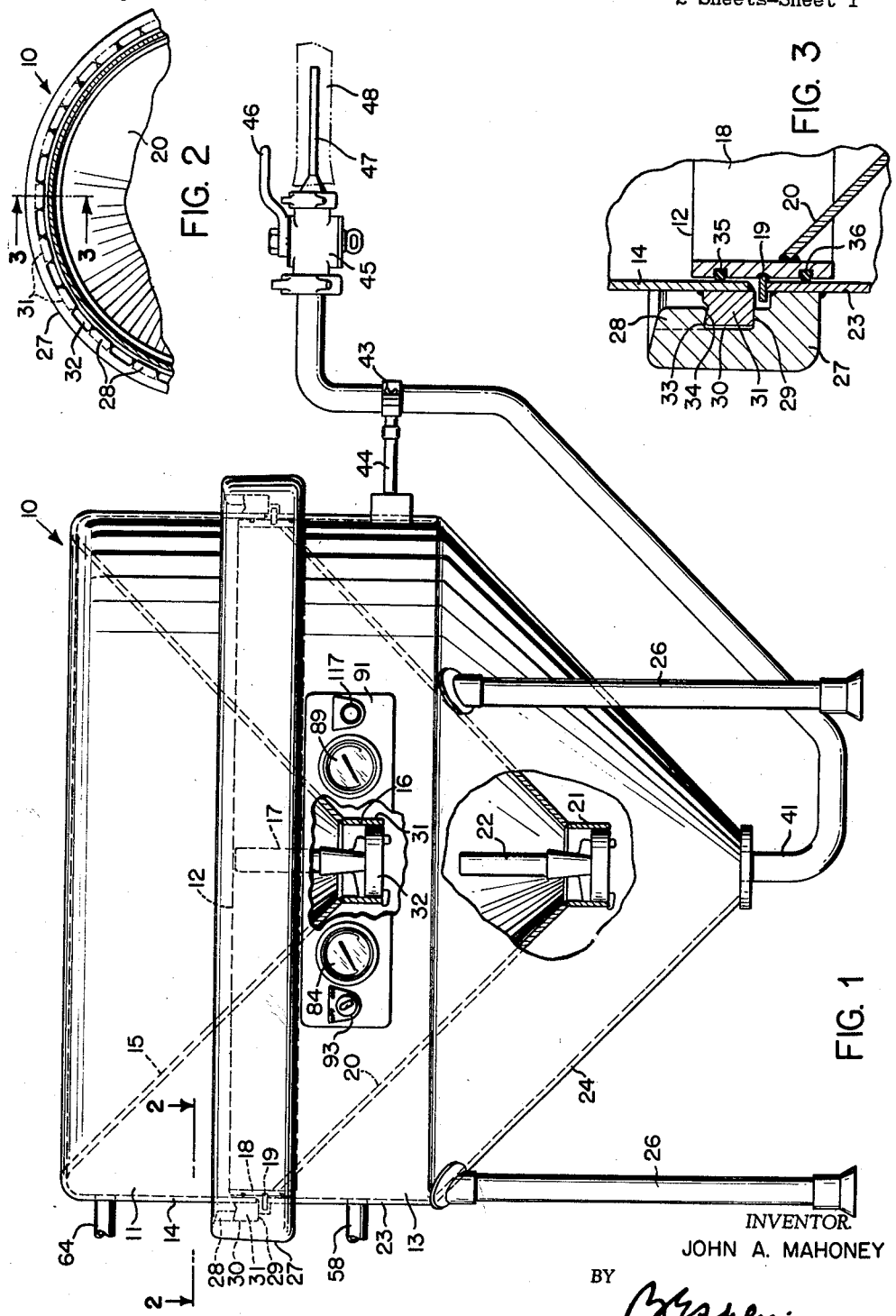
INVENTOR.
JOHN A. MAHONEY
BY
Attorney April 13, 1965     J. A. MAHONEY     3,177,525
METHOD AND MACHINE FOR STUFFING FOOD PRODUCTS INTO CASINGS
Filed April 17, 1963     2 Sheets-Sheet 2

INVENTOR.
JOHN A. MAHONEY
BY
Attorney

United States Patent Office 3,177,525
Patented Apr. 13, 1965

3,177,525
METHOD AND MACHINE FOR STUFFING FOOD PRODUCTS INTO CASINGS
John A. Mahoney, East Aurora, N.Y., assignor, by mesne assignments, to Liberty National Bank and Trust Company, Buffalo, N.Y.
Filed Apr. 17, 1963, Ser. No. 273,778
17 Claims. (Cl. 17—35)

This invention relates to a method and machine for stuffing material under pressure into casings, and more particularly to a machine for stuffing food emulsions, such as sausage meat and the like, into a skin or similar envelope.

Heretofore, when a casing has had to be filled with a slurry or emulsion the common practice has been to pump the fluid material into the casing. In manufacturing sausage, for instance, it has heretofore been customary to pump a ground meat emulsion under pressure into empty skin or casing until the meat fills and becomes compacted within the casing.

There are several disadvantages to this prior method of stuffing sausage casings. A pump may have a deleterious effect on the food emulsion as it passes through the pump casing. The moving elements within the pump tend to smear the product. Furthermore, a pump tends to grind up any large pieces which may be present in the emulsion. This is objectionable in cases where it is desired to stuff a sausage skin with a mixture of meat and, for instance, olives or the like. The pump tends to cut up the olives into small particles. Moreover, pumps tend also to produce objectionable air bubbles in the food emulsion. Such bubbles are likely to prevent the food casing from being fully packed. Then, too, a pump is difficult to clean.

An object of this invention is to provide improved apparatus for forcing an emulsion into a hollow casing.

A further object of this invention is to provide improved apparatus for stuffing flexible casings with food emulsions from a food source which is maintained under constant pressure.

Another object of this invention is to provide improved apparatus of the type described which will eliminate need for pumping a food emulsion into a casing and thereby obviate grinding up any of the ingredients suspended in the emulsion.

A further object of this invention is to provide apparatus of the type described which will remove air pockets from a food emulsion prior to its being stuffed into a food casing.

Another object of the invention is to provide improved apparatus adaptable to fill various kinds of tubular casings with emulsions or materials in semi-liquid state.

Other objects of the invention will be apparent hereinafter from the specification, and from the recital of the appended claims, particularly when read in conjunction with the accompanying drawings.

In the drawings:

FIG. 1 is a side elevation of a machine made in accordance with one embodiment of this invention, part of the machine being broken away;

FIG. 2 is a fragmentary sectional view of this machine taken along the line 2—2 in FIG. 1 and looking in the direction of the arrows, but on a reduced scale;

FIG. 3 is an enlarged sectional view taken along the line 3—3 in FIG. 2 and looking in the direction of the arrows;

Figure 4:
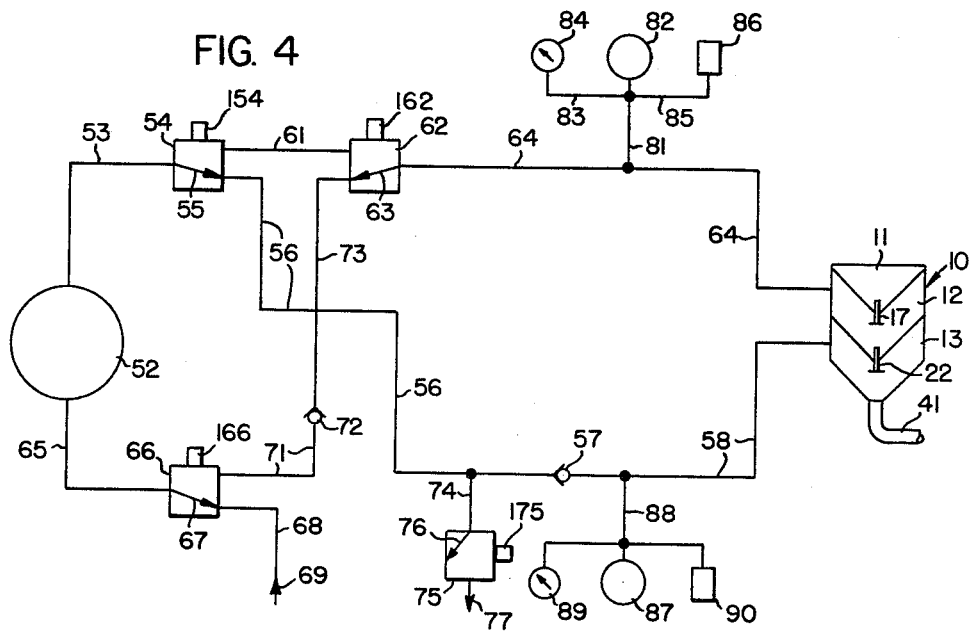
FIG. 4 is a diagrammatic illustration of the compressed air system employed to operate this machine.

Referring now to the drawings by numerals of reference, 10 denotes a compartmented hopper comprising a top compartment or bin 11, a middle compartment 12, and a bottom compartment 13.

The top compartment 11 has an outside cylindrical wall 14, and an inverted truncated conical wall 15, which is integral at its upper end with the upper edge of wall 14, and which acts as a funnel. Funnel portion 15 is welded at its lower end to a ring 16 which provides a seat for a conventional check valve 17.

The middle compartment 12 comprises an annulus 18 which has an outside diameter slightly less than the inside diameter of the outer wall 14 of the top compartment 11. Secured to the outer peripheral surface of annulus 18 intermediate the top and bottom thereof and projecting radially outwardly therefrom, is an external ring flange 19. Welded at its upper end to the inner surface of the annulus 18, is an inverted, truncated conical funnel portion 20. At its lower end the funnel portion 20 is welded to a ring 21 which provides a seat for a conventional check valve 22.

The bottom compartment 13 comprises a cylindrical wall 23 equal in diameter to wall 14; and an inverted, truncated conical funnel portion 24.

The bottom compartment 13 is supported on three vertically disposed, angularly spaced legs 26 (only two of which are shown in FIG. 1), which are secured at their upper ends to the exterior of wall 24. The middle compartment 12 is removably positioned in the bottom compartment 13 with its flange 19 resting on the upper edge of wall 23. Welded to and surrounding the wall 23 adjacent the upper end thereof is a metal locking ring 27 which projects axially upwardly beyond annulus 18 in radially spaced relation thereto. The ring 27 is formed with a plurality of equiangularly spaced, inwardly-projecting lugs 28. Beneath the lugs 28 the locking ring 27 is formed with an internal upwardly-facing shoulder 29. The shoulder 29, defines with the undersurfaces of lugs 28 and internal groove 30. The top compartment 11 has a plurality of radially outwardly projecting lugs 31 welded to it. The lugs 31 are equal in number to the lugs 28. The top compartment is removably secured to the middle compartment 12 by passing the lugs 31 down through the spaces 32 between adjacent lugs 28 of ring 27, and turning top compartment 11 slightly about its axis. Lugs 28 are undercut as denoted at 33 (FIG. 3); and the top surfaces 34 of lugs 31 slant downwardly inwardly at an angle matching the undercut of lugs 28 so that when lugs 31 are engaged under lugs 28 the top compartment is locked in position preventing disassembly of the compartments. To remove top compartment 11 from middle compartment 12, the top compartment need only be rotated until its lugs 31 register with the spaces 32 between lugs 28 of locking ring 27, and then lifted. Middle compartment 12 can then be lifted off bottom compartment 13.

O-rings 35 and 36 (FIG. 3) which seat in annular recesses in the outer peripheral surface of the annulus 18 above and below the flange 19, and engage the inner surfaces of walls 14 and 23, seal the annulus 18 relative to the top and middle compartments. The top compartment 11 thus forms an open hopper beneath which are disposed two superposed, airtight compartments 12 and 13.

Secured at one end in the open, lower end of wall 24 of bottom compartment 13 is a discharge pipe or conduit 41. Pipe 41 passes outwardly from beneath bottom compartment 13 and upwardly along the side thereof and is secured by a clamp and wing nuts 43 to a pipe bracket 44 which projects radially outwardly from the outside wall 23 of the bottom compartment. Beyond bracket 44 the upper end of pipe 41 extends radially outwardly from the hopper 10 and has secured thereon a stuffing valve 45 for controlling the flow of material from hopper 10. Valve 45 is controlled by a manually operable handle 46, and the outer or discharge end of the valve is connected to a tubular stem 47 over which the open end a flexible skin or casing 48 is adapted to be positioned for stuffing as shown by the broken lines in FIG. 1.

Figure 5:
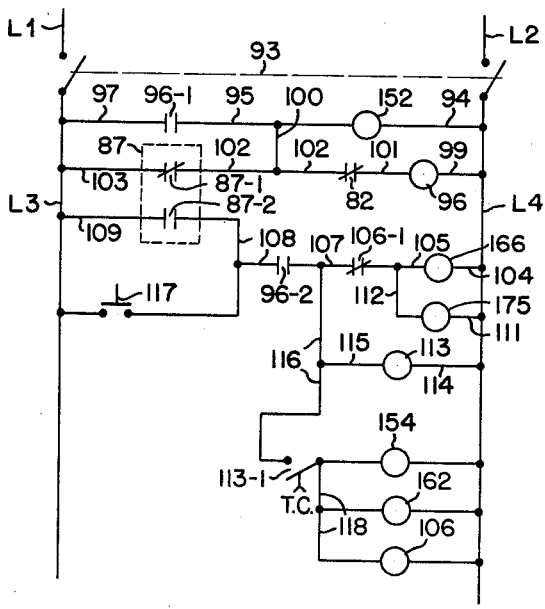
FIG. 5 is a diagrammatic illustration of one type of electrical circuit which may be employed to control the operation of this machine.

To control the flow of an emulsion through hopper 10, an electrically controlled compressed air system is connected to hopper 10 as shown schematically in FIGS. 4 and 5. Referring first to FIG. 4, a compressor 52 has its output side connected by a pipe 53 to a valve 54 which is operated by a solenoid 154. When the solenoid 154 is deenergized, the valve 54, as illustrated by arrow 55, is in its lowermost position so the compressed air from compressor 52 will pass through valve 54, a pipe 56, a check valve 57, and a pipe 58 to the sealed bottom compartment 13 in hopper 10. However, when the solenoid 154 is energized, the valve 54 shifts to its uppermost position so the compressed air from the compressor will pass through valve 54 and a pipe 61 to a further valve 62 which is controlled by solenoid 162. When the solenoid 162 is deenergized the valve 62 is in the position indicated at 63. However, by means of an electrical circuit to be described below, the solenoid 162 at this time is energized so that valve 62 is moved from its lower position shown in FIG. 4 to its upper position so that the compressed air in pipe 61 may pass through valve 62 and through a further pipe 64 to the middle compartment 12 in hopper 10.

The input side of compressor 52 is connected by a pipe 65 to another valve 66 which is operated by a solenoid 166, and which is capable of connecting the input side of the compressor to two different sources. Valve 66 when in the position denoted at 67, which is when the solenoid 166 is deenergized, is disposed so that the input side of the compressor is connected through pipe 65, valve 66 and a further pipe 68 to a fresh air supply indicated by the arrow 69. Alternatively, when the solenoid 166 is energized, the solenoids 154 and 162 and controlling valves 54 and 62 are deenergized, as will be described in more detail below, so that the input side of the compressor 52 is then connected through pipe 65, valve 66 in its upper position, pipe 71, a conventional check valve 72, a pipe 73, valve 62 and pipe 64 to the middle compartment 12 in hopper 10. At this time also, the output side of compressor 52 is connected through pipe 53, valve 54 in its lower position shown, pipe 56, and a pipe 74 to further valve 75, which is controlled by a solenoid 175. The solenoid 175 is at this time energized so that the valve 75, which is illustrated in FIG. 4 at 76 in its upper or closed position, is moved downwardly to open valve 75 so that air from the output side of compressor 52 may be exhausted to atmosphere as indicated by arrow 77.

For controlling the pressure in compartment 12, pipe 64 is connected through a pipe 81 to pressure operated switch 82 which will be described in more detail below. Connected to pipe 81 by a further pipe 83 is a combination pressure and vacuum gauge 84 for recording the pressure in compartment 12. Also connected by a pipe 85 to pipe 81 is a safety or pop valve 86 which limits the maximum allowable pressure that may be generated in compartment 12.

A second pressure switch 87 is connected by a pipe 88 with pipe 58 to communicate with the compartment 13 in hopper 10. A pressure gauge 89 and a safety valve 90 also are connected through pipe 88 with this compartment.

As shown in FIG. 1, the gauges 84 and 89 may be mounted on a panel 91 which is secured in a convenient place on the outside of hopper 10.

Referring now to the wiring diagram in FIG. 5, $L_1$ and $L_2$ desigate the terminals of a voltage supply which, upon the closing of the Off-On switch 93 (FIGS. 1 and 5) is connected to the lines $L_3$ and $L_4$. The motor 152, which drives compressor 52, is connected by wire 94 to line $L_4$, and by a wire 95, and a normally open relay switch 96–1, and a wire 97 to line $L_3$. The coil 96 of the relay which operates the relay switch 96–1 is connected in parallel with motor 152 by means of a wire 99, and by a wire 101, the normally-closed pressure switch 82, a wire 102, the normally-closed contacts 87–1 of pressure switch 87, and a wire 103. A wire 100, which extends between the wires 95 and 102, operatively connects the motor 152 to the power supply through switch contacts 87–1.

The solenoid 166 for operating valve 66 is connected by wire 104 to line $L_4$ and by wire 105, a normally closed relay switch 106–1, a wire 107, a normally open relay switch 96–2, which is responsive to the relay coil 96, a wire 108, the normally open contacts 87–2 of pressure switch 87, and a wire 109 to line $L_3$. The solenoid 175 for operating valve 75 is connected by wire 111 to line $L_4$, and by wire 112 to wire 105 thereby to place it in parallel with the solenoid 166. The coil 113 for a time delay relay is connected by a wire 114, to line $L_4$ and by wires 115, 116 to wire 107. The solenoids 154 and 162 for operating valves 54 and 62, respectively, and the coil 106 for a time relay coil, which operates the relay switch 106–1, are connected in parallel with one another between line $L_4$ and a wire 118 which is adapted to be connected to wire 116 by a normally open switch 113–1 which is responsive to the time delay relay operated by coil 113. A further, manually-operated push button switch 117, which may be mounted on panel 91 as shown in FIG. 1, is connected between line $L_3$ and wire 108 for a purpose to be described below.

In operation, a meat emulsion or the like of a generally fluid consistency is dumped or fed into the bin 11 at the top of hopper 10. At the start, the compartments 12 and 13, which form a sealed housing below bin 11, are at approximately atmospheric pressure; the valves 17 and 22 are closed; and the solenoids operating valves 54, 62, 66 and 75 are deenergized so that these valves are in the positions indicated by the arrows 55, 63, 67 and 76, respectively, in FIG. 4. Switch 93 (FIGS. 1 and 5) is then turned to its "On" position thereby energizing the compressor motor 152 through the normally closed switch 87–1. At this time the relay coil 96 is energized through switch 82, thereby closing the associated relay switches 96–1 and 96–2, both of which are held in a closed position as long their controlling relay coil 96 is energized. With switch 96–1 closed a circuit is made to the compressor motor 152, and a hold-in circuit is made to relay coil 96 through the now-closed switch 96–1, wire 100, and the normally closed switch 82, so that the coil 96 (and hence the motor 152) remains energized, even when switch 87–1 subsequently is opened by the increased pressure (for instance 125 pounds per square inch) in compartment 13. The compressed air from compressor 52 is at this time fed through pipe 53, valve 54, pipe 56, check valve 57, and pipe 58 to the bottom compartment 13. At this time the valve 22 is in its normally closed position, and the stuffing valve 45 is disposed in its "Off" position so that compartment 13 is effectively sealed.

When the pressure in compartment 13 has reached the desired pressure, say 125 lbs. per square inch, the switch arm 87–1 of the pressure switch 87 is opened, and the switch 87–2 of this pressure switch is closed. Since, as previously described, the pressure switch 82 is at this time closed, motor 152 and relay coil 96 remain energized, and the relay switch 96–2 remains closed so that a circuit is completed from line $L_3$ through wire 109, now-closed switch arm 87–2, wire 108, now closed switch arm 96–2, wire 107, the normally-closed relay switch 106–1, wire 105, solenoid 166, and wire 104 to line $L_4$. Circuits are also completed at this time from wire 105 through wire 112, solenoid 175 and wire 111 to line $L_4$; and from wire 107 through wires 116 and 115, the relay coil 113, and wire 114 to line $L_4$. With the solenoids 166 and 175 energized the valves 66 and 75 are shifted away from the positions indicated by the respective arrows 67 and 76 in FIG. 4 so that the fresh air supply 69 is cut off from the intake side of compressor 52, and the latter is connected instead by pipe 65, valve 66, pipe 71, check valve 72, pipe 73, valve 62, and pipe 64 to the middle compartment 12 in hopper 10. This switching of the valves 66 and 75 therefore subjects compartment 12 to vacuum so that air passes therefrom into the input side of compressor 52 and is exhausted from the latter through pipe 53, valve 54, pipe 56, pipe 74, and valve 75 to the atmosphere as indicated by the arrow 77. At this time check valve 57 prevents the compressed air in compartment 13 from leaking back through pipe 58 to the valve 75 which is at the time exhausting to atmosphere.

As the vacuum in compartment 12 increases toward a maximum of say 20″ Hg, the normally-closed valve 17 is forced downwardly relative to its position as illustrated in FIG. 1 as a result of the atmospheric pressure exerted upon the emulsion disposed in bin 11, thereby opening valve 17 so that the emulsion in bin 11 is drawn downwardly into compartment 12.

During the period of time in which the emulsion is being drawn into compartment 12, the time delay relay 113 is energized, as above described, and is operative, after a predetermined period of time to cause relay switch arm 113-1 to close. The closing of switch arms 113-1 simultaneously energizes the solenoids 154 and 162, and the relay coil 106. This immediately causes the valves 54 and 62 to be moved to their upper positions from the positions denoted at 55 and 63 in FIG. 4, and also opens the normally-closed relay switch arm 106-1 to deenergize solenoids 166 and 175 so that the valves 66 and 75 return to the positions illustrated in FIG. 4. The compressor motor 152 is at this time still running so that compressed air from the compressor 52 passes through pipe 53, valve 54, pipe 61, valve 62, and pipe 64 to compartment 12. The latter is at this time sealed, the valve 17 having automatically returned to its closed position upon the termination of the vacuum in compartment 12; and the pressure in compartment 13 is at this time at approximately 125 lbs. per square inch so that valve 22 is held firmly in its closed position. Also at this time the valve 66 has returned to its lower position 67 (FIG. 4) so that air is once again drawn into compressor 52 from the fresh air inlet 69.

As the compressor continues to operate, the pressure in compartment 12 builds up to exceed the pressure in compartment 13, the differential causing valve 22 to be forced downwardly to permit the emulsion to flow from compartment 12 into compartment 13. Pressure switch 82 will have been adjusted to open at a pressure slightly above the pressure of 125 pounds per square inch in compartment 13. When the pressure in compartment 12 causes switch 82 to open, the circuit to the relay coil 96 is interrupted so that the switches 96-1 and 96-2 return to their normally open positions, thereby breaking the circuit to the compressor motor 152, the relay coils 113 and 106, and the solenoids 154 and 162.

After the pressure in compartment 12 drops below say 135 pounds per square inch gauge, the pressure switch 82 will once again return to its normally closed position, but the relay coil 96 will not again be energized until the pressure in compartment 13 drops low enough (below say 125 pounds per square inch gauge) to permit switch arms 87-1 and 87-2 to return to their normally closed position and normally open position, respectively. This drop in pressure will occur as quantities of the emulsion are tapped off from the bottom of compartment 13 through pipe 41 and the stuffing valve 45. When the pressure once again falls below say 125 pounds per square inch in compartment 13, switch 87-1 will return to its closed position so that the cycle may repeat itself, once again raising the pressure in compartment 13 to say 125 pounds per square inch and thereafter subjecting compartment 12 to a vacuum as above described.

If it is desired to draw in more material from bin 11, the operator need only push the manually operable push-button 117, thereby bypassing the normally open switch 87-2. The advantage of the push-button switch 117 is that it permits semi-automatic filling of the compartment 13 with an emulsion rather than relying solely upon the automatic cycle of the machine for such filling. For instance, when compartment 13 is first being filled, or when emulsion is being rapidly exhausted therefrom through the stuffing valve 45, the quantity of emulsion which is drawn into compartment 13 during each cycle of the machine operation will be dependent upon the length of time it takes for switch 113-1 to close after the energization of its relay 113. Assuming that relay 113 is set so that it permits only a partial filling of compartment 13 each time it is energized, it would take a considerable amount of time to completely fill compartment 13. On the other hand with push-button 117 it is possible to repeat the loading of emulsion from compartment 12 to compartment 13 without having to wait upon the closure of switch 87-2.

From the foregoing it will be apparent that I have developed a machine which performs the dual function of removing undesirable air pockets from a food emulsion or the like, and thereafter forcing the emulsion under a constant pressure into an envelope or container. Not only does the feeding of the emulsion under constant pressure tend to eliminate the formation of undesirable air pockets in the emulsion after it has been packed in the envelope, but also, particularly in the case of stuffing meat emulsions into sausage skins or the like, it tends to pack the meat emulsion uniformly into the skin so that the completed sausage has a nearly constant density. Moreover, unlike prior pump operated apparatus applicant's machine is easy to clean.

While this invention has been described as being particularly adaptable for the stuffing of a fluid food product such as meat emulsion or the like into a flexible casing, it is to be understood the invention is usable also in feeding other materials into envelopes or containers. For instance, mortar, cement, or plastics etc. can be fed through hopper 10 and stuffed into a form or mold of desired configuration.

While the invention has been described, then, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for stuffing a fluid material into a hollow casing, comprising
   (a) a hopper having a bin into which fluid material is dumped, and at least two chambers,
   (b) a first normally closed check valve in said hopper adapted to communicate with a supply of fluid material in said bin and operable, when open, to admit said material to one of said two chambers,
   (c) a second normally closed check valve in said hopper operable, when open, for admitting said material from said one chamber to the other of said chambers,
   (d) a manually operable valve associated with said hopper, to control the flow of said material from said other chamber to the interior of the casing which is to be stuffed,
   (e) means operable intermittently for maintaining the pressure in said other chamber above the pressure of the fluid material in said bin,
   (f) means operable intermittently for lowering the pressure in said one chamber below the pressure of the fluid material in said bin to open said first valve for a predetermined period of time thereby to draw said material from said bin into said one chamber, (g) means operable intermittently, when said first valve is closed, for raising the pressure in said one chamber above the pressure in said other chamber to open said second valve thereby to force said material from said one chamber into said other chamber, and (h) means to actuate successively the first-named means, said pressure lowering means, and then said pressure raising means when the pressure in said other chamber falls below a predetermined value.

2. Apparatus as claimed in claim 1 wherein said actuating means comprises an electrical circuit including (a) a first switch operable automatically to actuate said pressure lowering means, when the pressure in said other chamber is raised above said predetermined value, (b) a second switch operative automatically, after the operation of said pressure lowering means for said predetermined period of time, to actuate said pressure raising means, and (c) a third switch responsive to the pressure in said one chamber and operative automatically to interrupt the operation of said pressure raising means, when the pressure in said one chamber reaches a predetermined value above the pressure in said other chamber.

3. Apparatus as defined in claim 2 a further switch which is manually operable successively to actuate said pressure lowering and then pressure raising means independently of said first switch.

4. Apparatus for stuffing fluid material into a hollow casing, comprising (a) a hopper having a bin into which fluid material is dumped, and at least two chambers disposed below said bin, (b) normally closed pressure operated valve means in said hopper operable selectively to connect one of said chambers to a supply of fluid material in said bin and to the other of said chambers, respectively, (c) means connected to said chambers and operable intermittently to change the pressure in said one chamber and to maintain the pressure in said other chamber above the pressure in said bin, (d) control means for the last-named means operative, when the pressure in said other chamber reaches a predetermined value above the pressure in said bin, automatically to cause said last-named means successively to reduce the pressure in said one chamber to a value below the pressure in said bin, and then to increase the pressure in said one chamber to a value greater than the pressure in said other chamber, (e) said valve means being operative, when the pressure in said one chamber is below the pressure in said bin, to connect said one chamber to said bin thereby to admit said material to said one chamber, and operative, when the pressure in said one chamber is greater than the pressure in said other chamber, to connect the latter to said one chamber thereby causing said material in said one chamber to be forced under pressure into said other chamber, and (f) further valve means connected to a discharge port in said other chamber and operable to control the flow of said material from said other chamber to the interior of the casing which is to be stuffed.

5. Apparatus as defined in claim 4 wherein said last-named means comprises (a) a compressor, and (b) a plurality of valves operable selectively to connect said other chamber to the output side of said compressor, when the pressure in said other chamber falls below said predetermined value, and to connect said one chamber successively to the input and output sides, respectively, of said compressor, thereby first to reduce and then increase the pressure in said one chamber to said values below the pressure in said bin and above the pressure in said other chamber, respectively.

6. Apparatus as defined in claim 5 wherein said valves are electrically operated, and, said control means comprises (a) an electrical circuit having a plurality of switches for controlling the operation of said valves, (b) at least one of said switches being operative automatically to cause said valves to disconnect said other chamber from the output side of said compressor, when the pressure in said other chamber has exceeded said predetermined value, and (c) other of said switches being operative automatically to cause said valves to connect said one chamber successively to said input and output sides, respectively, of said compressor, when said other chamber is disconnected from said output side of said compressor.

7. Apparatus as defined in claim 6 wherein said circuit includes a further switch manually operable independently of said one switch to disconnect said other chamber from said output side of said compressor before the pressure in said other chamber has reached said predetermined value.

8. Apparatus as defined in claim 6 wherein said other switches include (a) a first switch operative after a predetermined period of time to cause said valves to switch the connection of said one chamber from the input to the output side of said compressor, and (b) a second switch operative to cause said valves to disconnect said one chamber from said compressor when the pressure in said one chamber has reached a further predetermined value above the value of the pressure in said other chamber.

9. Apparatus for stuffing fluid material into a hollow casing, comprising (a) a hopper having a supply bin and two chambers positioned beneath said bin, (b) a compressed air system connected to said chambers and having a plurality of electrically operated valves for controlling the flow of compressed air in said system, (c) an electrical circuit for selectively controlling the operation of said valves, and including (d) at least one switch operative upon being moved to one position to cause said valves to direct the flow of air in said system to create a vacuum in one of said chambers, (e) a pressure-operated valve mounted in said hopper and operative to place said one chamber in communication with a supply of fluid material in said bin upon the creation of said vacuum thereby to draw said material from said bin into said one chamber, (f) further switches operative subsequent to the movement of said one switch to said one position to cause the first-named valves to direct the flow of air in said system into said one chamber to raise the pressure therein, (g) a further, pressure-operated valve in said hopper operative, when the pressure in said one chamber has reached a value greater than the pressure in said other chamber, to admit said material from said one chamber to said other chamber, and (h) means for selectively exhausting said material from said other chamber to the interior of the casing which is to be filled.

10. Apparatus as defined in claim 9 wherein (a) said one switch is a pressure switch normally disposed in a position opposite to said one position when the pressure in said other chamber is below a predetermined value, and is movable automatically to said one position when the last-named pressure reaches said predetermined value, and (b) said one switch is operative, when in said opposite position, to cause said first-named valves to direct the flow of air in said system into said other chamber to raise the pressure therein to said predetermined value.

11. Apparatus as defined in claim 9 wherein said further switches include a pressure switch operative, when the pressure in said one chamber has reached a certain value above the pressure in said other chamber, to cause said valves to interrupt the flow of air in said system into said other chamber.

12. Apparatus for forcing fluid material into a hollow container comprising (a) a bin into which the fluid material is dumped, (b) a first compartment below said bin and connectable with said bin, (c) a first normally-closed check valve controlling connection of said first compartment and said bin and adapted to be opened upon creation of suction in said first compartment, and to be closed when said first compartment is under pressure, (d) a second compartment below said first compartment and connectable with said first compartment, (e) a second normally-closed check valve controlling the connection of said first and second compartments, and adapted to be opened, when said first compartment is under greater pressure than said second compartment, (f) control means for first applying suction to said first compartment to open said first check valve and cause the material to flow under atmospheric pressure from said bin into said first compartment and for then applying pressure to said first compartment greater than the pressure in said second compartment to close said first valve and to open said second valve, to cause the material to flow from said first compartment into said second compartment, and (g) means for applying pressure to said second compartment while said first compartment is under pressure to force the material out of said second compartment through an exhaust port therein into the container.

13. The method of stuffing a sausage casing with a fluid meat emulsion, comprising (a) placing a supply of meat emulsion in a container which is at atmospheric pressure, (b) creating a vacuum in a compartment which communicates with said container to draw said emulsion from said container into said compartment, and simultaneously to evacuate air from said emulsion, (c) sealing said compartment and thereafter increasing the pressure therein to a value above atmospheric pressure to force said emulsion from said compartment to a further compartment which communicates with the first-named compartment, (d) thereafter sealing said further compartment, and (e) then discharging said emulsion from said further compartment into a sausage casing while maintaining the pressure in said further compartment at a value above atmospheric pressure.

14. Apparatus for stuffing fluid material into a hollow casing, comprising (a) a housing having at least two chambers therein, (b) means for supplying fluid material under pressure to said housing, (c) a first, normally-closed check valve mounted in said housing and movable to an open position to admit fluid material from said supply means to one of said chambers, when the pressure in said one chamber is below the pressure in said supply means, (d) means operable intermittently to maintain the pressure in the other of said two chambers above the pressure in said supply means, (e) means operable between operations of the second-named means successively to lower the pressure in said one chamber below the pressure in said supply means, and to increase the pressure in said one chamber above the pressure in said other chamber, (f) a second, normally-closed check valve mounted in said housing and movable to an open position to allow the fluid material in said one chamber to pass into said other chamber, when the pressure in said one chamber is greater than the pressure in said other chamber, (g) a normally closed, manually operable valve associated with said housing and movable to an open position to connect said other chamber to the interior of the casing which is to be stuffed, and (h) control means operative automatically to actuate said second-named means each time the pressure in said other chamber falls below a predetermined value.

15. Apparatus as defined in claim 14, wherein said control means includes means operable manually to actuate the third-named means independently of said second-named means.

16. Apparatus for stuffing a fluid material from a supply thereof into a hollow casing, comprising (a) a hopper having therein a sealed compartment, (b) means for feeding fluid material from a supply thereof into said compartment, (c) vacuum means operable intermittently to reduce the pressure in said compartment to a value below atmospheric pressure, and (d) means for discharging said fluid material from said compartment to a hollow casing, including (e) a normally closed, pressure-responsive valve set to open, when the pressure in said compartment reaches a predetermined value above atmospheric pressure, and (f) compressed air means operative in the intervals between operation of said vacuum means to increase the pressure in said compartment until it reaches said predetermined value above atmospheric pressure.

17. Apparatus as defined in claim 16, wherein said feeding means comprises a normally closed, pressure-responsive valve interposed between said supply and said compartment and set to open, when the fluid at said supply is greater than the pressure in said compartment.

References Cited by the Examiner

UNITED STATES PATENTS

| 1,787,916 | 1/31 | Polson et al. | 137—575 X |
| 3,081,484 | 3/63 | Schnell | 17—35 |

SAMUEL KOREN, *Primary Examiner.*

LUCIE H. LAUDENSLAGER, *Examiner.*